(12) United States Patent
Sridhar (10) Patent No.: US 9,197,691 B2
(45) Date of Patent: Nov. 24, 2015

(54) SYSTEM AND METHOD FOR LATENCY MEASUREMENT AT EACH NETWORK ELEMENT PARTICIPATING AS AN RTP RELAY IN A TELECOMMUNICATION NETWORK

(75) Inventor: Sriram Sridhar, Lowell, MA (US)

(73) Assignee: Google Technology Holdings LLC, Mountain View, CA (US)

( * ) Notice: Subject to any disclaimer, the term of this patent is extended or adjusted under 35 U.S.C. 154(b) by 417 days.

(21) Appl. No.: 13/252,716

(22) Filed: Oct. 4, 2011

(65) Prior Publication Data

US 2013/0083808 A1    Apr. 4, 2013

(51) Int. Cl.
*G01R 31/08*    (2006.01)
*H04L 29/06*    (2006.01)

(52) U.S. Cl.
CPC ............ *H04L 65/605* (2013.01); *H04L 65/608* (2013.01); *H04L 65/80* (2013.01)

(58) Field of Classification Search
CPC ...... H04L 65/605; H04L 65/80; H04L 65/608
USPC .......................... 370/229, 231, 235, 252, 475
See application file for complete search history.

(56) References Cited

U.S. PATENT DOCUMENTS

| | | | |
|---|---|---|---|
| 4,506,358 A * | 3/1985 | Montgomery | 370/409 |
| 5,450,394 A | 9/1995 | Gruber et al. | |
| 5,793,976 A * | 8/1998 | Chen et al. | 709/224 |
| 5,878,032 A * | 3/1999 | Mirek et al. | 370/252 |
| 6,308,078 B1 | 10/2001 | Van De Water | |
| 7,313,095 B1 * | 12/2007 | Nucci et al. | 370/238 |
| 7,653,730 B1 | 1/2010 | Hoffman et al. | |
| 2003/0016627 A1 | 1/2003 | MeLampy et al. | |
| 2003/0091052 A1 * | 5/2003 | Pate et al. | 370/395.1 |

OTHER PUBLICATIONS

Friedman et al, RTP Control Protocol Extended Report (RTCP XR), from Applicant's IDS filed on Oct. 4, 2011.*
Friedman et al, RTP Control Protocol Extended Report (RTCP XR), p. 21: Delay since last RR (DLRR)), from Applicant's IDS filed on Apr. 19, 2012.*
Friedman, T et al., "RTP Control Protocol Extended Report (RTCP XR)", Network Working Group RFC: 3611, Nov. 2003. (From Applicant's IDS filed on Oct. 4, 2011).*
Singer, D. et al.: "A general mechanism for RTP Header Extensions", RFC 5285, draft-ietf-avt-rtp-hdrext-15.txt, AVT Internet-Draft, Expires: Sep. 12, 2008, all pages.
Friedman, T et al.: "RTP Control Protocol Extended Reports (RTCP XR)", Network Working Group RFC: 3611, Nov. 2003, all pages.

(Continued)

*Primary Examiner* — Mang Yeung
(74) *Attorney, Agent, or Firm* — Lerner, David, Littenberg, Krumholz & Mentlik, LLP (57) ABSTRACT

A real-time transport packet creating system and method are provided for use with a source terminal, a destination terminal and a real-time transport packet. The real-time transport packet creating device includes a receiver, a latency generator and a transmitter. The receiver can receive the real-time transport packet from the source terminal at a first time. The latency generator can generate an output real-time transport packet. The transmitter can transmit the output real-time transport packet to the destination terminal at a second time. The output real-time transport packet is based on the received real-time transport packet, the first time and the second time.

15 Claims, 7 Drawing Sheets

(56) References Cited

OTHER PUBLICATIONS

Schulzrinne et al.: "RTP: A Transport Protocol for Real-Time Applications", Internet Engineering Task Force, RFC 3550, Internet Draft, draft-ietf-avt-rtp-new-12.txt, Mar. 2, 2003, Expires: Sep. 2003, all pages.

Friedman, T et al: "RTP Control Protocol Extended Reports (RTCP XR)", Network Working Group RFC: 3611, Nov. 2003, all pages.

Kevin Lee: "How to Calculate Latency Time", http://www.ehow.com/how_7675735_calculate-latency-time.html, eHow tech, downloaded from internet: Apr. 3, 2012, all pages.

\* cited by examiner

PRIOR ART

| INDEX | NETWORK ELEMENT | COMPUTED LATENCY VALUE |
|---|---|---|
| 1 | ONT 128 | 10 msec |
| 2 | OLT 112 | 20 msec |
| 3 | SBC 116 | 100 msec |
| 4 | SWITCH 118 | 500 msec |
| 5 | SBC 120 | 80 msec |
| 6 | OLT 124 | 25 msec |
| 7 | ONT 130 | 15 msec |

TOTAL = 750 msec

*FIG. 7*

SYSTEM AND METHOD FOR LATENCY MEASUREMENT AT EACH NETWORK ELEMENT PARTICIPATING AS AN RTP RELAY IN A TELECOMMUNICATION NETWORK

BACKGROUND

The present invention relates to the field of telecommunication networks, in particular, data latency introduced in fiber optics communication networks.

In a telecommunication network, messages generated by a source terminal pass through a network of links and nodes until they arrive at a destination terminal. A telecommunication network using fiber optics communications is able to provide voice, video and data services straight to the customers' homes or businesses.

Voice over Internet Protocol (Voice over IP, VoIP) is one of a family of internet technologies for delivery of voice communications and multimedia sessions over Internet Protocol (IP) networks, such as the internet. Real-time Transport Protocol (RTP) in conjunction with RTP Control Protocol (RTCP) is commonly used for delivering audio and video over IP networks. Voice telephony services, such as services normally associated with POTS (Plain Old Telephone Service), provided to the customers internally use a VoIP protocol for signaling such as Session Initiation Protocol (SIP).

RTP defines a standardized packet format for delivering audio and video over IP networks. Some non-limiting application examples of RTP include streaming media for communication and entertainment systems, such as, telephony and video conferencing applications. While RTP carries the media streams, for example, audio and video, RTCP is used to monitor transmission statistics and Quality of Service (QoS) and aids synchronization of multiple streams.

SIP is an IETF (Internet Engineering Task Force) defined signaling protocol, which is used for controlling multimedia communication sessions, such as voice and video calls, over IP networks. SIP, when used in conjunction with RTP, for voice and video stream communications, follows Session Description Protocol (SDP) for defining the parameters associated with the media streams. SDP does not deliver media itself but is used for negotiation between end points of media type, format, and all associated properties.

With an increasing number of users utilizing the networks for voice, data and video services, the network operators are facing the next big issue in ensuring the quality of service to the end users. In regards to the voice quality, the major problem that comes up is the voice transmission delay introduced by the network itself. This is further explained with the help of FIG. 1.

Figure 1:
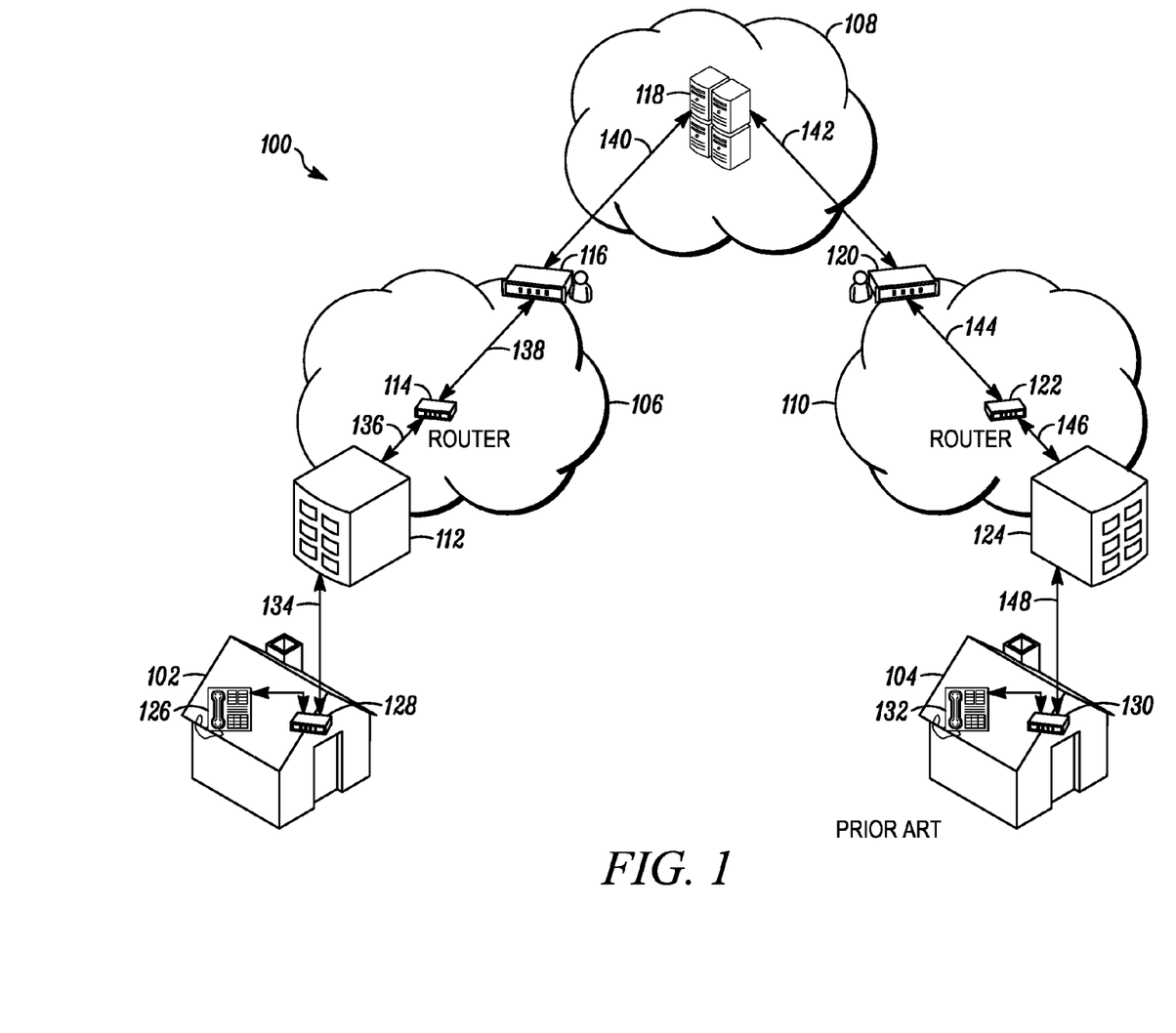
FIG. 1 illustrates a conventional telecommunication network of the prior art.

FIG. 1 illustrates a conventional telecommunication network 100.

As illustrated in FIG. 1, conventional telecommunication network 100 includes a user terminal 102 and a user terminal 104. Conventional telecommunication network 100 or just referred to as 'network' in this specification, is distributed into different network zones. In this example, a distributed network zone 106 represents the caller side and a distributed network zone 110 represents the callee side. A distributed network zone 108 includes a soft switch 118, which is the central intelligence for routing the calls.

User terminal 102 further includes a phone 126 and an optical network terminal (ONT) 128. User terminal 104 further includes a phone 132 and an ONT 130. Distributed network zone 106 further includes an optical line terminal (OLT) 112, a router 114, and a session border controller (SBC) 116. Distributed network zone 110 further includes a SBC 120, a router 122, and an OLT 124.

In FIG. 1, phone 126, ONT 128, phone 132, ONT 130, OLT 112, router 114, SBC 116, soft switch 118, SBC 120, router 122, and OLT 124 are illustrated as distinct devices. However, at least two of phone 126, ONT 128, phone 132, ONT 130, OLT 112, router 114, SBC 116, soft switch 118, SBC 120, router 122, and OLT 124 may be combined as a unitary device.

Conventional telecommunication network 100 makes use of RTP in conjunction with RTCP and SIP to provide voice, data and video services between user terminal 102 and user terminal 104. In this example, FIG. 1 illustrates a routing path for a voice packet traversing in conventional telecommunication network 100 from user terminal 102 to user terminal 104.

User terminal 102 may be a residence or an office building, where ONT 128 is installed. In FIG. 1, ONT 128 is connected to telephone 126, however, in other cases, ONT 128 may also be connected to a computer and/or a television set. ONT 128 operates as a media converter, which converts electric signals from phone 126 to fiber-optic light signals. ONT 128 is operable to deliver multiple POTs lines, internet data and video to OLT 112 via an optical link 134.

For the purposes of discussion, consider that a voice packet is to be transmitted from user terminal 102 to user terminal 104. The voice packet traverses through distributed network zone 106, distributed network zone 108 and distributed network zone 110 before it is received by user terminal 104.

ONT 128 transmits the voice packet in the form of an RTP packet via optical link 134, which is destined for SBC 116. The RTP packet employs the RTP protocol for real time data transfer and the RTCP protocol for control and QoS feedback and SIP signaling protocol. Each RTP packet includes an appropriate time stamp for synchronization, a sequence number for packet loss and reordering detection, and a payload format, which indicates the encoded format of the data, along with some other parameters, which are discussed in detail with the help of FIG. 2.

An RTP session is established, which includes a source and a destination IP address and a pair of ports for RTP and RTCP. The RTP packet is sent via optical link 134 and includes the destination IP address for SBC 116.

Optical link 134 may be a part of a Passive Optical Network (PON), which is terminated at OLT 112. OLT 112 can support a number of PONs, which are terminated at ONTs near end users. When OLT 112 receives the RTP packet via optical link 134 from ONT 128, the OLT coverts the RTP into electric signals.

OLT 112 transmits a signal 136 comprising the RTP packet to router 114, which functions as a gateway router for SBC 116. Router 114 works with SBC 116 in order to keep data flowing between networks or between different locations within distributed network zone 106. Router 114 forwards the RTP packet via a signal 138, which is destined for SBC 116.

SBC 116 functions as a gateway to interconnect distributed network zone 106 and distributed network zone 108 and manages flow of session data across distributed network zone 106 and distributed network zone 108. In addition, SBC 116 may perform security functions to protect the networks, quality of service (QoS) functions of a network, and connectivity functions among different parts of the network, and provides support for regulatory requirements. SBC 116 receives the RTP packet and maps it to an RTP packet destined for switch 118.

Switch 118 receives the RTP packet via a signal 140 from SBC 116. Switch 118 functions as a Back-to-Back User Agent (B2BUA), which is the central intelligence for routing calls. In one example, switch 118 may be a CS2K (Communication server 2000) or Broadsoft B2BUA softswitch. Switch 118 follows SIP to manage multimedia VoIP telephone calls. The switch operates between both end points of a phone call or communication session, which are phone 126 and phone 132 in this example, and divides the communication channels into two call legs and mediates all SIP signaling between both ends of the call, from call establishment to call termination. Switch 118 maps the RTP packet received from SBC 116 in to an RTP packet destined for SBC 120. Switch 118 delivers RTP packet destined for SBC 120 via a signal 142.

SBC 120 interfaces with distributed network zone 108 and sits at the border of distributed network zone 110. SBC 120 receives the RTP packet from switch 118 and maps the RTP packet to an RTP packet destined for ONT 130. SBC 120 transmits the RTP packet to router 122 via a signal 144.

Router 122 transmits RTP packet, which is destined for ONT 130, via a signal 146 to OLT 124.

OLT 124 coverts electric signals into fiber optic signals in order to deliver the RTP packet to ONT 130 via an optical link 148. ONT 130 coverts fiber optic signals to electric signals such that the voice packet transmitted originally by phone 126 can be received by phone 132.

In the illustrated example of FIG. 1, an active voice call between two POTS lines traverses via SBC 116, switch 118 and then back to SBC 120. SBC 116, switch 118 and SBC 120 act as a B2BUA and relay the RTP media. ONT 128, OLT 112, SBC 120, SBC 116, switch 118, OLT 124 and ONT 130 are also referred to as network elements. A conventional RTP packet generated by ONT 128 traverses a path as illustrated in FIG. 1, and is discussed below with the help of FIG. 2.

Figure 2:
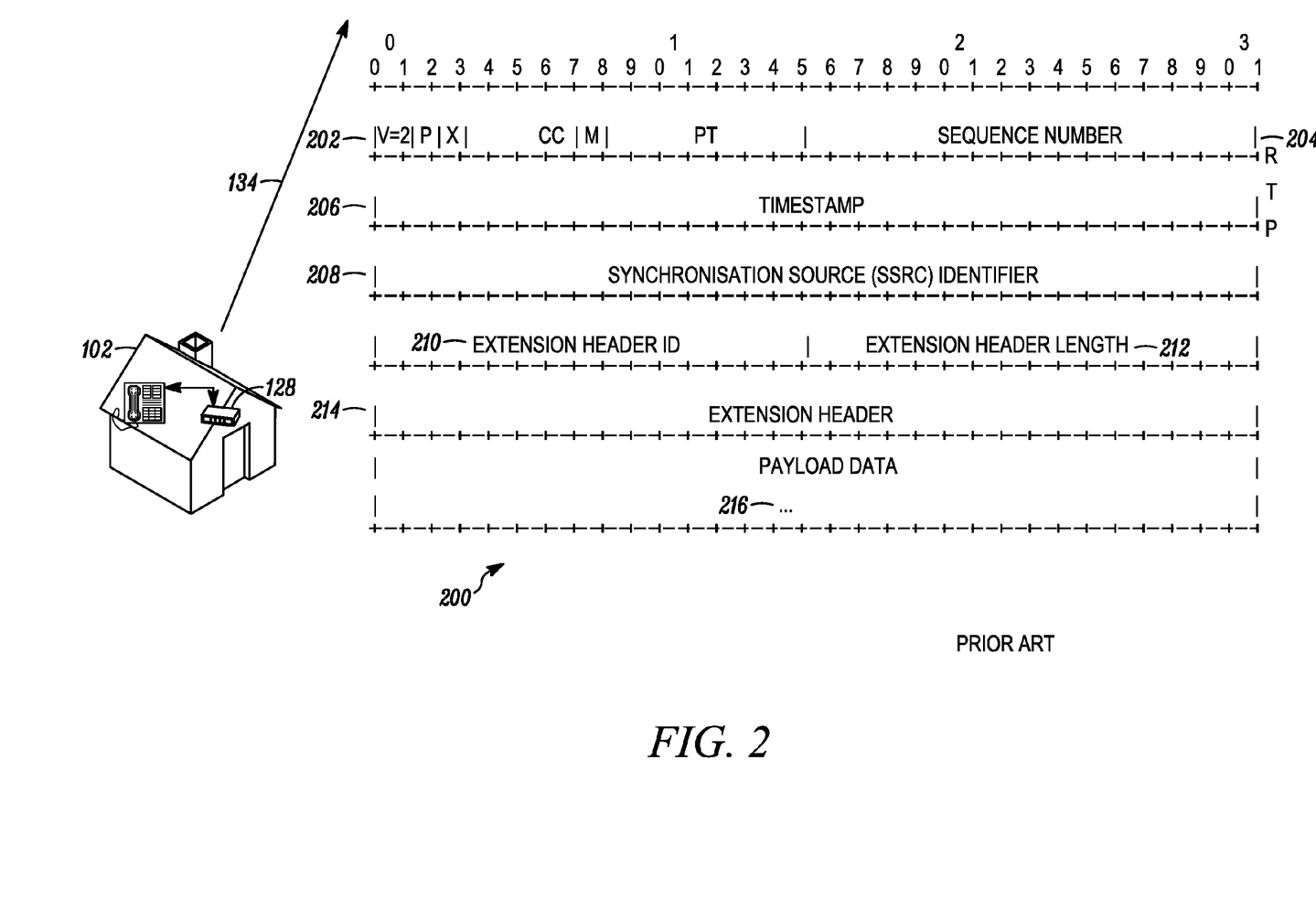
FIG. 2 illustrates a conventional RTP packet of the prior art.

FIG. 2 illustrates a conventional RTP packet 200.

As illustrated in FIG. 2, conventional RTP packet 200 includes multiple data fields 202-216.

In this example of conventional RTP packet 200, data field 202 is shown to include a 2-bit version V, a padding bit P, an extension bit X, a 4-bit CSRC (Contributing Source) count CC, a marker bit M and a 7-bit payload type PT. However, in other cases, version bit V, padding bit P, extension bit X, CSRC count CC, marker bit M and payload type PT may correspond to individual fields.

Version V indicates the version of the RTP protocol. Padding P indicates if there are extra padding bytes at the end of the RTP packet. Padding may be used to fill up a block of certain size, for example, as required by encryption algorithms. Extension bit X indicates the presence of an extension header between the standard header and the payload data. CSRC count CC indicates the number of CSRC identifiers that follow the fixed header. CSRC identifiers enumerate contributing sources to a stream, which has been generated from multiple sources. Marker bit M is used at the application level and is defined by a profile. If M bit is set, it indicates that the current data has some special relevance for that application. Payload type PT indicates the format of the payload and determines its interpretation by the application.

Data field 204 indicates a sequence number, which is incremented by one for each RTP packet sent and is to be used by a receiver to detect packet loss and to restore packet sequence. Data field 206 indicates a timestamp, which is used by the receiver to play back the received samples at appropriate intervals. Data field 208 indicates a synchronization source (SSRC) identifier, which uniquely identifies a source of a stream of data. Data fields 202-208 are RTP fixed header fields. An extension mechanism is provided in order to allow additional information to be carried in the RTP data packet header using the extension bit X in the RTP header. If the extension bit X is set to one, the RTP fixed header must be followed by exactly one header extension, described below with the help of data fields 210-214.

When the extension bit X in the RTP header is set to one, data field 210, data field 212, and data field 214 are used to indicate any profile specific values for a specific application. Data field 210 indicates an extension header identifier (ID) specific to a profile. Data field 212 indicates extension header length, which indicates a length of the extension. Data field 214 indicates extension header itself.

Data field 216 comprises payload data transported by RTP in a packet, for example, audio samples or compressed video data.

As discussed with reference to FIG. 1, an RTP packet generated by ONT 128 traverses the path through distributed network zone 106, distributed network zone 108, and distributed network zone 110 before reaching ONT 130. Each network element will advertise its own IP address and port via Session Description Protocol (SDP) information exchanged as part of the Session Initiation Protocol (SIP) signaling when the RTP session is set up. When these network elements start receiving RTP and RTCP packets, they map these packets internally to another port and send it to the destination IP address and port. Hence, it is obvious that for data traversing from user terminal 102 to user terminal 104, there are three levels of RTP packet conversion being done, that is, at SBC 116, switch 118, and SBC 120. For a voice call made by user terminal 102, RTP packet conversion introduces latency in the voice as perceived by user terminal 104.

RTP packet conversion done at SBC 116, switch 118, and SBC 120 is performed to adhere to FBI wiretapping policies enforced in the networks. Ideally, a 50-100 millisecond (msec) end-to-end network delay introduced by the latency could be acceptable. Conventional telecommunication network 100 supports voice, data and video services for a huge number of ONTs deployed at the end users, which introduces considerable latency in conventional telecommunication network 100.

In situations when one or more SBCs or switches are taken off of the network, resulting in traffic that is overloaded on backup SBCs and switches, end-to-end network delay is higher due to longer latency. In such situations, when the end users suffer from delay in voice reception, there is currently no mechanism to troubleshoot the problem so as to find the highest latency path in the network and minimize it.

What is needed is a system and method to measure the latency introduced at each network element that participates as an RTP relay in a telecommunication network.

BRIEF SUMMARY

The present invention provides a system and method to measure the latency introduced at each network element that participates as an RTP relay in a telecommunication network.

In accordance with an embodiment of the present invention, a real-time transport packet creating system and method are provided for use with a source terminal, a destination terminal, and a real-time transport packet. The real-time transport packet creating device includes a receiver, a latency generator, and a transmitter. The receiver can receive the real-time transport packet from the source terminal at a first time. The latency generator can generate an output real-time transport packet. The transmitter can transmit the output real-time transport packet to the destination terminal at a second time. The output real-time transport packet is based on the received real-time transport packet, the first time and the second time.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Systems and methods, in accordance with embodiments of the present invention, provide a solution to measure the latency introduced in a telecommunication network by participating network elements that act as an RTP relay in the telecommunication network. The measured latency information can be used by a network administrator to cause an alarm for running diagnostics on the network element responsible for the highest latency value, which exceeds the threshold for a minimum tolerable latency value.

Figure 3:
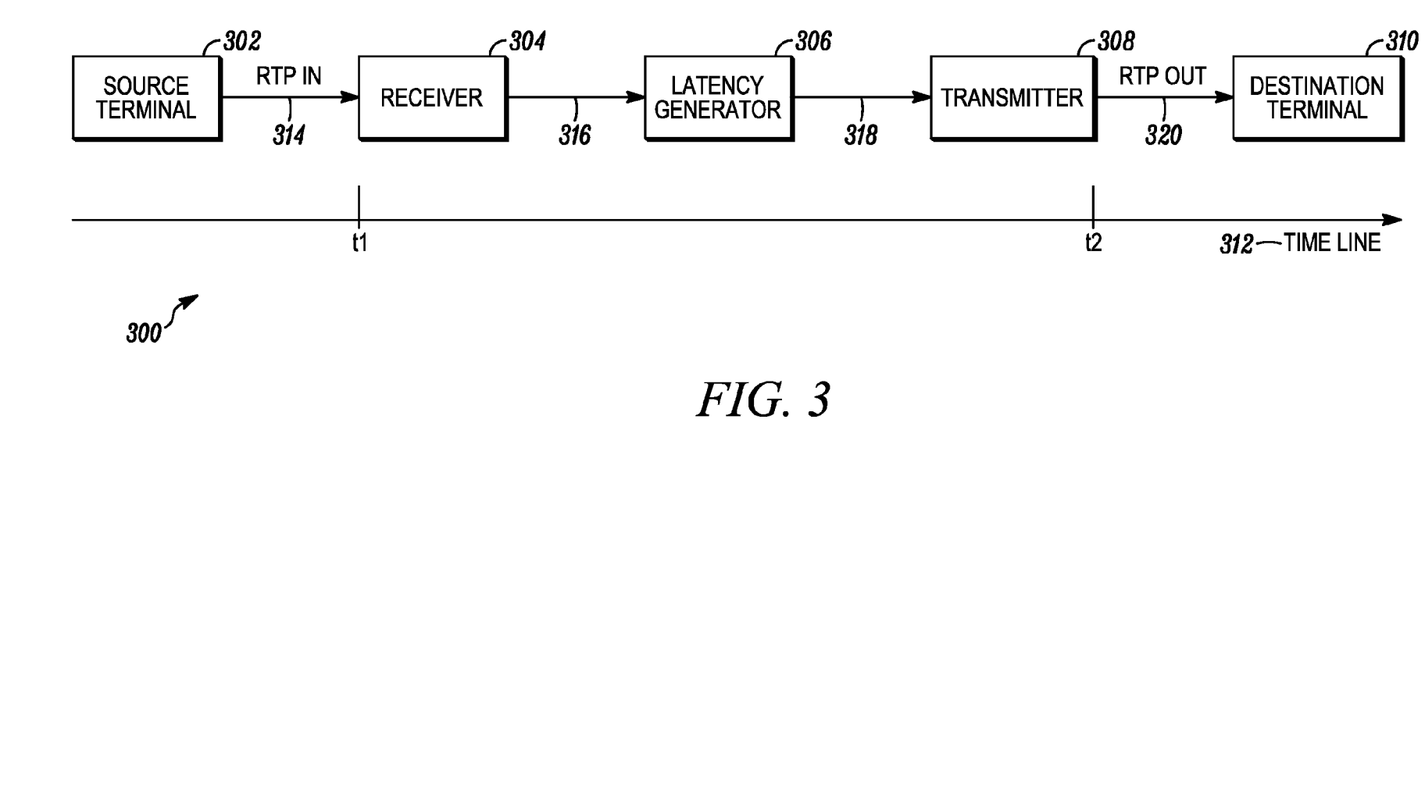
FIG. 3 illustrates a system for transfer of an RTP packet in accordance with an embodiment of the invention.

FIG. 3 illustrates a system 300 for transfer of an RTP packet in accordance with an embodiment of the invention.

As illustrated in FIG. 3, system 300 includes a source terminal 302, a receiver 304, a latency generator 306, a transmitter 308 and a destination terminal 310. Receiver 304, latency generator 306, and transmitter 308 are illustrated as individual devices; however, in some embodiments at least two of receiver 304, latency generator 306, and transmitter 308 may be combined as a unitary device. For example, receiver 304, latency generator 306, and transmitter 308 all may be components of a network element such as ONT 128, OLT 112, SBC 120, SBC 116, switch 118, OLT 124 and ONT 130 of FIG. 1, source terminal 302 may be any user terminal or other network element from which the network element comprising components 304, 306, and 308 receives an RTP packet, and destination terminal 310 may be any user terminal or other network element to which the network element comprising components 304, 306, and 308 conveys an RTP packet.

Further, in some embodiments, at least one of receiver 304, latency generator 306, and transmitter 308 may be implemented as a tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a tangible computer-readable medium. Thus, any such connection is properly termed a tangible computer-readable medium. Combinations of the above should also be included within the scope of tangible computer-readable media.

Source terminal 302 provides an RTP packet to receiver 304 via a signal 314. For purposes of illustrating the principles of the present invention, take an example wherein source terminal 302 is ONT 128 and receiver 304 is OLT 112.

Receiver 304 receives RTP packet from source terminal 302 at a first time, time $t_1$, as indicated by a timeline 312. Time $t_1$ is an originating time, or a time that receiver 304 received the RTP packet. Receiver 304 adds timing information associated with the originating time, that is, $t_1$, to the RTP packet and delivers the updated RTP packet to latency generator 306 via a signal 316.

Latency generator 306 adds latency information to the RTP packet before delivering the RTP packet to transmitter 308. In one embodiment of the present invention, SBC 116, switch 118, and SBC 120 combined may represent latency generator 306, as they introduce latency in the travel path of the RTP packet due to the RTP packet conversion at different stages. Latency generator 306 measures the actual latency introduced at each network element that participates as an RTP relay, and includes in the RTP packet, for example, appends to the RTP packet, a computed latency value, which latency value is computed by the latency generator and corresponds to the measured latency.

For example, and again for illustrative purposes and referring to the network elements of network 100 of FIG. 1, in accordance with embodiments of the invention, SBC 116 may append the RTP packet destined to switch 118 with a first latency value corresponding to the measured latency introduced at SBC 116. Switch 118 further may append the RTP packet destined to SBC 120 with a second latency value corresponding to the measured latency introduced at switch 118. And SBC 120 further may append the RTP packet destined to ONT 130 with a third latency value corresponding to the measured latency introduced at SBC 120. Details of how the RTP packets are updated to include the measured latency values are discussed below with the help of FIG. 4. Updated RTP packets (that is, RTP packets with the appended latency values) then are delivered to transmitter 308 via a signal 318.

Returning now to FIG. 3, transmitter 308 receives the updated RTP packet, which includes the latency information introduced at each network element that participates as an RTP relay, and transmits the updated RTP packet to destination terminal 310 via a signal 320 at a second time, time $t_2$, as indicated by timeline 312. In one embodiment of the present invention, transmitter 308 is OLT 124 and destination terminal 310 is ONT 130.

The latency value of the measured latency introduced at SBC 120 is based on $t_1$ and $t_2$. In an example embodiment, the latency value is $t_2-t_1$.

As an RTP packet travels from a source terminal to a destination terminal, the information corresponding to the latency, introduced at each network element that participates as an RTP relay is included in the RTP packet for each network element. This information can be used to determine how much delay was caused by each network element in the network. There may be a threshold value for the latency introduced at each stage beyond which the delay is not acceptable.

Referring again, for illustrative purposes, to the network elements of network 100 of FIG. 1, when the RTP packet reaches ONT 130, the RPT packet includes the entire list of latency delays introduced at SBC 116, switch 118, and SBC 120. In the case when the network is supported by an Internet standard protocol for managing devices on IP networks, such as SNMP (Simple Network Management Protocol), ONT 130 forwards this information as an alarm for exceeding the threshold value via an SNMP statistics report as voice call history.

Embodiments of the invention utilize the extension field X in the RTP packet to include, in the packet, the latency information introduced at each network element. Known prior arts that discuss the approach to add RTP header extension in an RTP packet, for example RFC 3550—section 5.3, and RFC 5285—section 4.3, do not however discuss appending an RTP packet with the latency value by the network elements that implement the RTP relay functionality.

In accordance with an embodiment of the invention, the actual latency introduced at each network element in a telecommunication network, that participates as an RTP relay is measured by the network element. A latency value corresponding to the measured latency is appended to the list of extension header in the RTP packet and is transmitted upstream to the next hop network element that participates as an RTP relay. An RTP packet including the latency value, in accordance with an embodiment of the invention, is discussed below with the help of FIG. 4.

Figure 4:
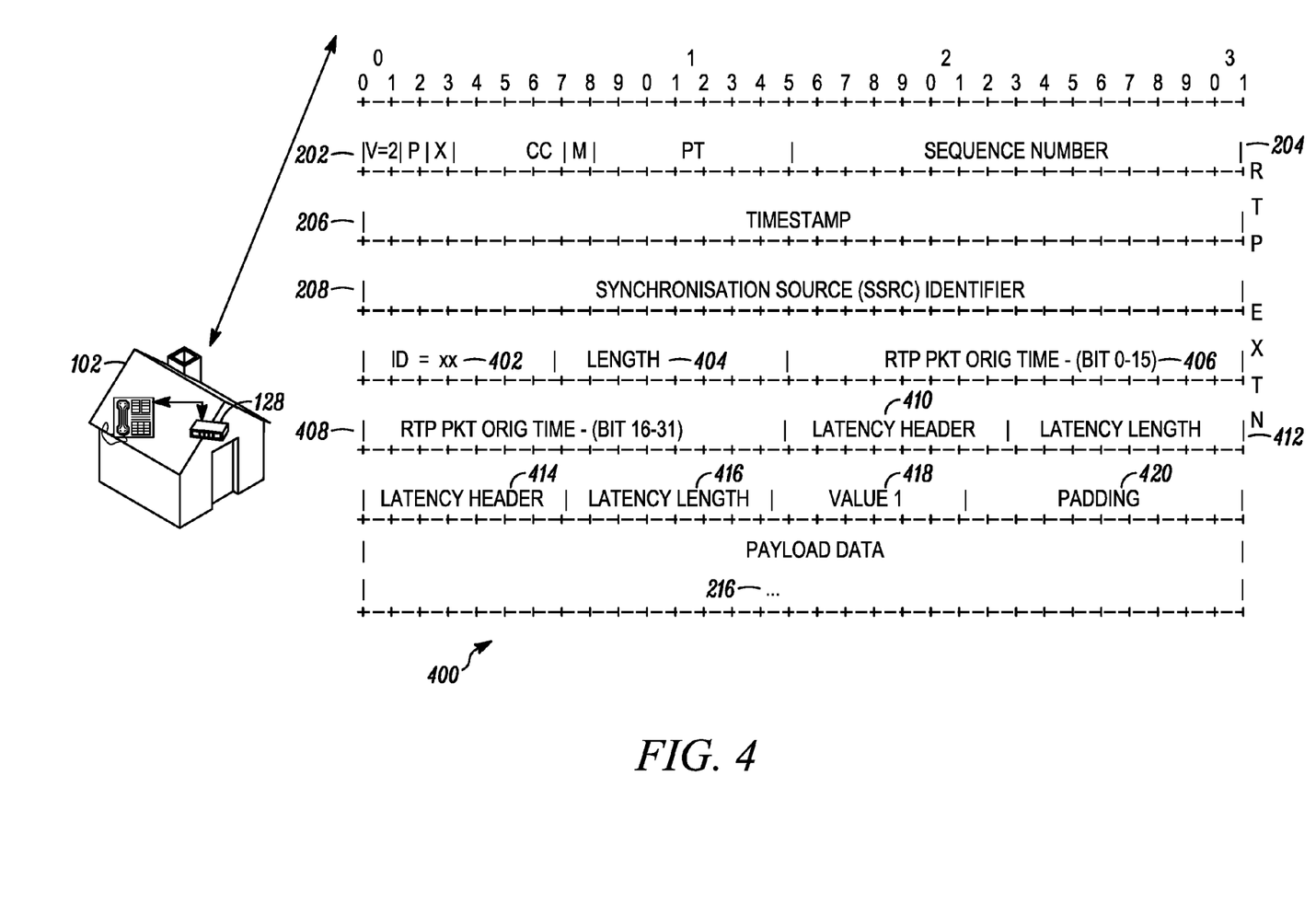
FIG. 4 illustrates an example RTP packet in accordance with an embodiment of the invention.

FIG. 4 illustrates an example RTP packet 400 in accordance with an embodiment of the invention.

For purposes of discussion, consider a situation where ONT 128 is transmitting RTP packet 400, which is destined for SBC 116.

As illustrated in FIG. 4, RTP packet 400 includes data fields 202-216 similar to RTP packet 200. However, unlike RTP packet 200, RTP packet 400 further includes multiple data fields 402-420.

For RTP packet 400, extension field X is set to one indicating that the extension header is used, which is described below with the help of data fields 402-420.

A first data field 402 of the multiple data fields 402-420 specifies an ID which identifies that the extension header is for a particular application, which in this case is latency measurement. A second data field 404 of the multiple data fields 402-420 is a length data field and has length data stored therein. Data field 404 specifies length of the extension, which is equal to number of bits added as an extension. For example, with additional reference to FIG. 3, the value of the data in data field 404 is based on a difference between a length of the output RTP, output from transmitter 308, and a length of the received RTP, received at receiver 304.

A third data field 406 of the multiple data fields 402-420 specifies the lower sixteen bits (bits [0-15]) of RTP packet 400 originated time in NTP (Network Time Protocol) format. A fourth data field 408 of the multiple data fields 402-420 specifies the higher sixteen bits (bits [16-31]) of RTP packet 400 originated time in NTP format.

Together, data fields 406 and 408 represent the RTP packet originated timestamp in 64-bits. For example, ONT 128 may fill in a wall-clock time (that is, an 'originated' timestamp) in NTP format before sending out RTP packet 400. The RTP packet originated timestamp may be used by a RTP packet receiver, for example, ONT 130, to calculate how much time it actually took for RTP packet 400 to reach the receiver. This can be done by converting the NTP originated time stamp into the current time zone format at ONT 130 and then subtracting this time stamp from the current time at ONT 130.

A fifth data field 410 of the multiple data fields 402-420 specifies a latency header that uniquely identifies that the rest of the information that follows this header in RTP packet 400 is the latency values introduced by different network elements, which act as a B2BUA. A sixth data field 412 of the multiple data fields 402-420 specifies the length of latency in bytes. For each latency value, the length of the latency is incremented by one. A seventh data field 414 of the multiple data fields 402-420 specifies a latency header that uniquely identifies that the rest of the information that follows this header in RTP packet 400 is the latency values introduced by different network elements, which act as a B2BUA. An eighth data field 416 of the multiple data fields 402-420 specifies the length of latency in bytes.

For each latency value, the length of the latency is incremented by one. A ninth data field 418 of the multiple data fields 402-420 is a value data field having value data stored therein. In this example, data field 418 specifies a value '1,' which is the computed latency value for ONT 128. With reference to FIG. 3, the latency value in data field 418 will be the measured latency introduced at SBC 120, e.g., $t_2-t_1$.

A tenth data field 420 of the multiple data fields 402-420 specifies a padding value needed to fill up a data block to align the bytes.

RTP packet 400 then is delivered to a next network element that participates as an RTP relay, which is SBC 116 in telecommunication network 100. SBC 116 appends the RTP packet with the additional latency values before delivering the RTP packet to switch 118, which will now be discussed below with reference to FIG. 5.

Figure 5:
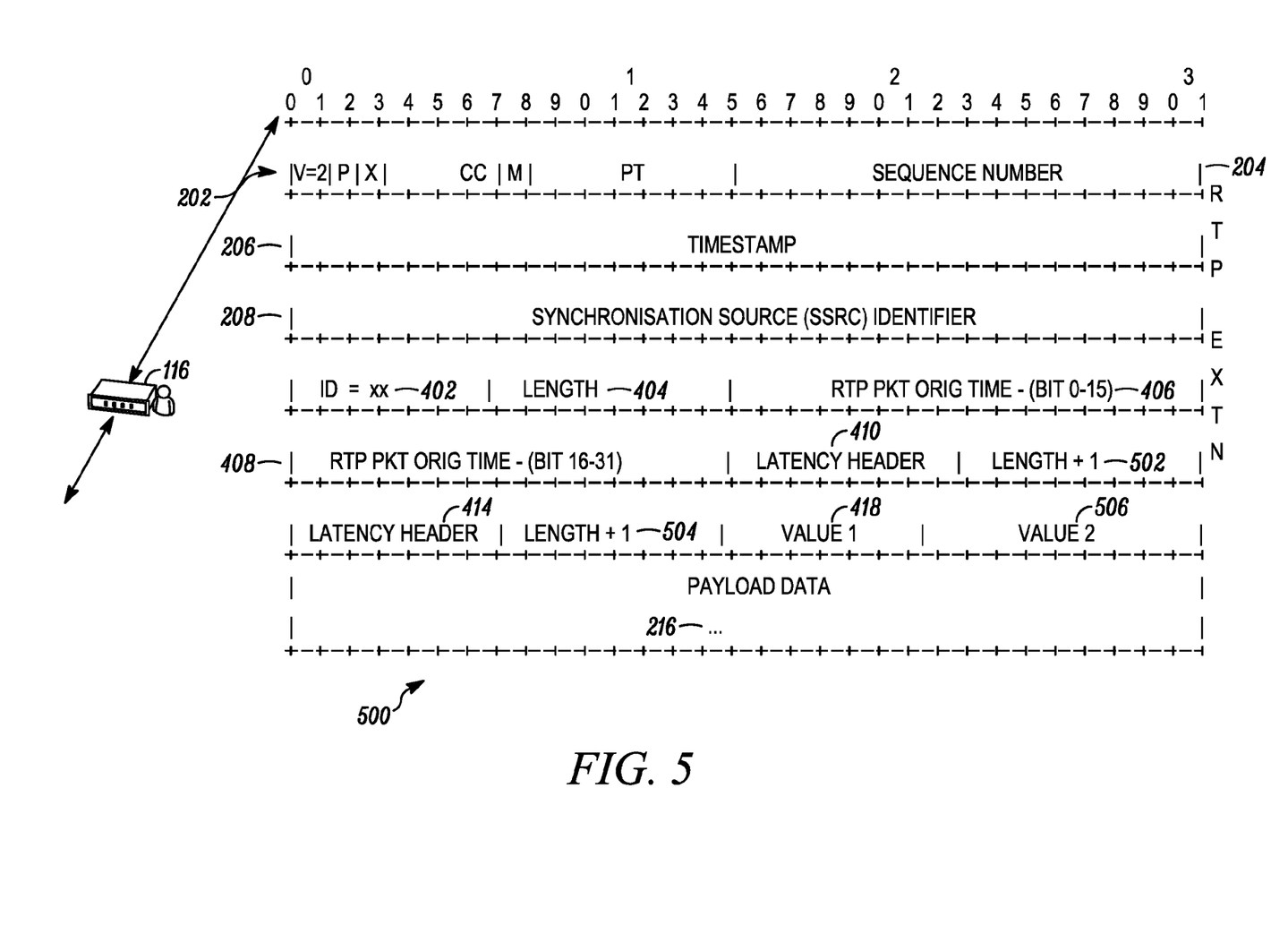
FIG. 5 illustrates another example RTP packet in accordance with an embodiment of the invention.

FIG. 5 illustrates another example RTP packet 500 in accordance with an aspect of the invention.

For purposes of discussion and in order to illustrate the principles of the present invention, consider the situation where SBC 116 is transmitting RTP packet 500, which is destined for switch 118.

As illustrated in FIG. 5, RTP packet 500 includes all the fields of RTP packet 400 except that data field 412, 416, and 420 are replaced by data fields 502, 504, and 506, respectively.

Data fields 502 and 504 indicate 'length+1' bytes and data field 506 indicates a 'value 2.' Latency length value in data fields 502 and 504 is incremented by one because of addition of a second latency value in data field 506.

Each network element in telecommunication network 100 measures the latency and appends a latency value corresponding to the measured latency to the RTP packet until the RTP packet reaches the final destination, which is ONT 130. ONT 130 receives the list of latency values that specify the entire list of latency delay introduced in telecommunication network 100 and sends this information to a network administrator for further action. The final RTP packet received by ONT 130 is explained in detail with the help of FIG. 6.

Figure 6:
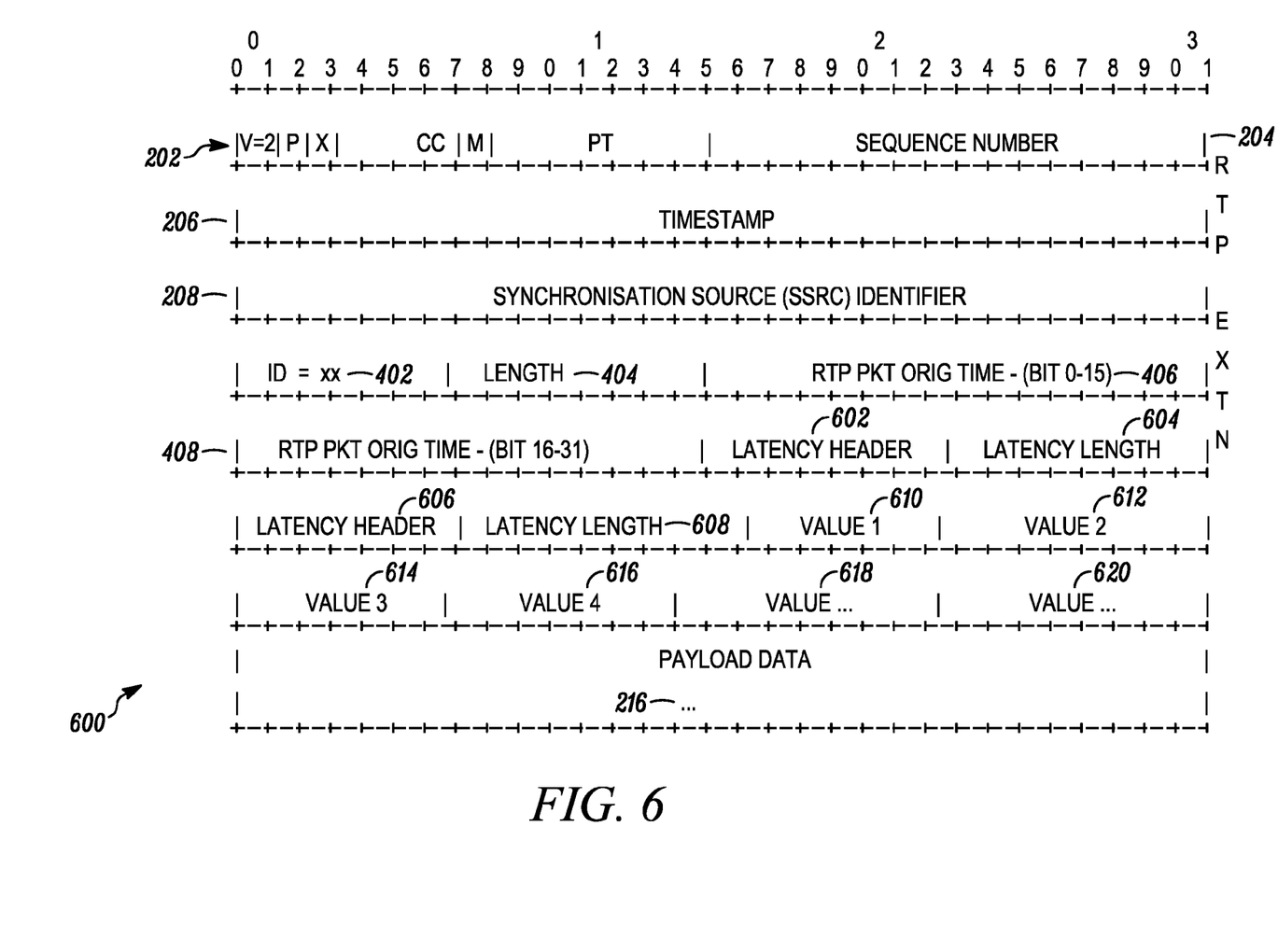
FIG. 6 illustrates another example RTP packet in accordance with an embodiment of the invention.

FIG. 6 illustrates an example RTP packet 600 in accordance with an aspect of the invention.

As illustrated in FIG. 6, RTP packet 600 includes most of the fields of RTP packet 500 and further includes data fields 602-620.

RTP packet 600 as received by ONT 130 includes latency values 610, 612, 614, 616, 618 and 620, which latency values specify the entire list of latency values introduced in the network. Note that the latency length in data field 604 and the latency length in data field 608 specify the length of the list up to the latency value in data field 620 in this example embodiment. Latency header data field 602 and latency header data field 606 specify the header values.

Both ONT 128 and ONT 130 involved in an active call can compute the latency introduced in the RTP Packet transmission. An appropriate alarm or notification then may be performed when the computed latency value (which is the sum of all of the latency values) exceed a threshold for a minimum tolerable latency that could be introduced by telecommunication network 100.

Once the latency value for each network element is known, the network element which contributed to the highest latency value then can be to be determined. An index to each latency value in the list of latency values may be included in the RTP packet, which index specifies the actual network element that introduced the corresponding delay. Based on the index, the network element which contributed to the highest latency value can be determined. This is explained below with the help of FIG. 7.

Figure 7:
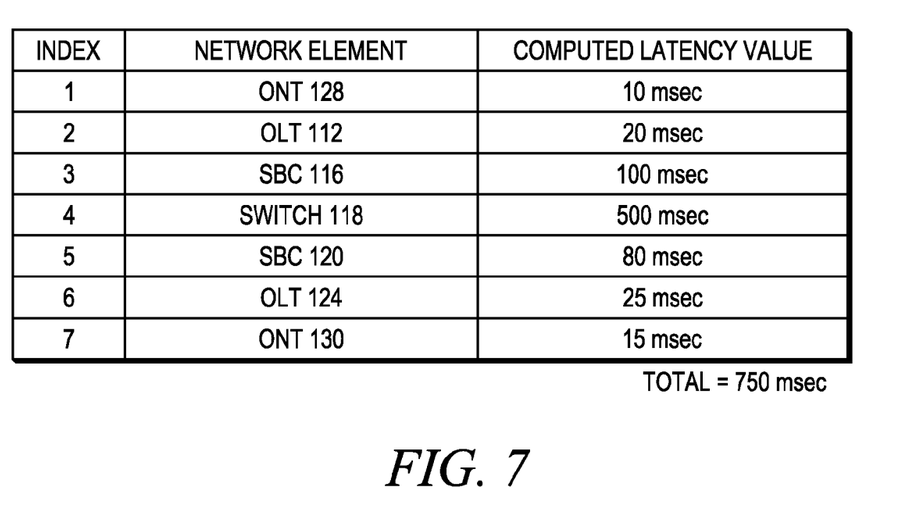
FIG. 7 illustrates example latency values for different network elements of the telecommunication network of FIG. 1.

FIG. 7 illustrates example latency values for different network elements of telecommunication network 100.

As an example, suppose that the computed latency values for ONT 128, OLT 112, SBC 116, switch 118, SBC 120, OLT 124 and ONT 130 are 10 msec, 20 msec, 100 msec, 500 msec, 80 msec, 25 msec and 15 msec, respectively, as shown in FIG. 7.

ONT 130 receives the upstream voice packet, which has the computed latency values as listed in FIG. 7. The sum of latency values obtained from the list of latency values is 750 msec, which is much higher than the tolerable threshold of 50-100 msec in one example. Looking at the numbers as listed in FIG. 7, it is easy to conclude that switch 118 contributes to the highest latency introduced in the RTP traffic.

Switch 118 is the fourth network element in the list of latency values, which can be easily identified from a call SIP from a list of "Via" headers, which is also appended sequentially by the network elements to a SIP message exchanged among the network elements when the RTP session is set up. Therefore, by correlating the latency header values and the index of these values to the network elements that introduced this delay, the bad network element can be easily located. The overall latency value is forwarded to a network administrator for further troubleshooting the latency issue and fixing it appropriately at the respective network element.

When a network administrator needs to troubleshoot where the maximum latency is introduced in the network, network elements that participate as RTP relays are provisioned via external means to turn on the latency measuring features. This could be done via SNMP or some other means, which is not discussed in this specification.

The network elements that support this latency measuring feature can advertise their participation in SDP, in one example. The RTP message layout for the network elements which support the latency measuring feature follows RTP packet 600.

Aspects of the invention provide a system and method for computing the overall latency delay introduced in VoIP networks. As discussed with reference to FIG. 3, as an RTP packet travels from a source terminal to a destination terminal, the information corresponding to the latency, introduced at each network element that participate as an RTP relay, is appended to the RTP packet for each network element. RTP packet is updated with a new latency value introduced at each network element as discussed with reference to FIGS. 4-6.

Destination terminal decodes the latency header information from the RTP packet and computes the overall latency. As discussed with reference to FIG. 7, the network element contributing to the highest latency value can be determined from the list of latency value appended to the RTP packet. Appropriate alarm or notification can be performed when the computed latency value exceeds the threshold for a minimum tolerable latency value that could be introduced by a network.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A real-time transport packet creating device for use with a source terminal, a destination terminal and a real-time transport packet, the real-time transport packet creating device comprising:
   a receiver operable to receive a real-time transport packet from the source terminal at a first time;
   a latency generation logic is operable to generate an output real-time transport packet including a length data field having length data stored therein; and
   a transmitter operable to transmit the output real-time transport packet to the destination terminal at a second time,
   wherein the output real-time transport packet is based on the received real-time transport packet, the first time and the second time, and
   wherein the length data is based on a difference between a length of the output real-time transport packet and a length of the received real-time transport packet.

2. The real-time transport packet creating device of claim 1,
   wherein the latency generation logic is operable to generate the output real-time transport packet to include a value data field having value data stored therein, and
   wherein the value data is based on a difference between the second time and the first time.

3. The real-time transport packet creating device of claim 2, wherein the latency generation logic is operable to generate the output real-time transport packet to further include an originating time data field having originating time data stored therein, and
   wherein the originating time data is based on the first time.

4. The real-time transport packet creating device of claim 1, wherein the latency generation logic is operable to generate the output real-time transport packet to include an originating time data field having originating time data stored therein, and
   wherein the originating time data is based on the first time.

5. A method of communicating with a source terminal and a destination terminal by way of a real-time transport packet, the method comprising:
  receiving, via a receiver, the real-time transport packet from the source terminal at a first time;
  generating, via a latency generator, an output real-time transport packet including a length data field having length data stored therein; and
  transmitting, via a transmitter, the output real-time transport packet to the destination terminal at a second time,
  wherein generating, via the latency generator, an output real-time transport packet comprising generating the output real-time transport packet based on the received real-time transport packet, the first time and the second time, and
  wherein the length data is based on a difference between a length of the output real-time transport packet and a length of the received real-time transport packet.

6. The method of claim 5,
  wherein the generating, via a latency generator, an output real-time transport packet comprises generating the output real-time transport packet to include a value data field having value data stored therein, and
  wherein the value data is based on a difference between the second time and the first time.

7. The method of claim 6,
  wherein generating the output real-time transport packet to include a value data field having value data stored therein comprises generating the output real-time transport packet to further include an originating time data field having originating time data stored therein, and
  wherein the originating time data is based on the first time.

8. The method of claim 5,
  wherein the generating, via a latency generator, an output real-time transport packet comprises generating the output real-time transport packet to include an originating time data field having originating time data stored therein, and
  wherein the originating time data is based on the first time.

9. A non-transitory computer-readable media having computer-readable instructions stored thereon, the computer-readable instructions being capable of being read by a computer to be used with a source terminal and a destination terminal by way of a real-time transport packet, the tangible computer-readable instructions being capable of instructing the computer to perform the method comprising:
  receiving, via a receiver, the real-time transport packet from the source terminal at a first time;
  generating, via a latency generator, an output real-time transport packet including a length data field having length data stored therein; and
  transmitting; via a transmitter, the output real-time transport packet to the destination terminal at a second time,
  wherein the generating, via a latency generator, an output real-time transport packet comprises generating the output real-time transport packet based on the received real-time transport packet, the first time and the second time, and
  wherein the length data is based on a difference between a length of the output real-time transport packet and a length of the received real-time transport packet.

10. The non-transitory computer-readable media of claim 9, the computer-readable instructions being capable of instructing the computer to perform the method,
  wherein the generating, via a latency generator, an output real-time transport packet comprises generating the output real-time transport packet to include a value data field having value data stored therein, and
  wherein the value data is based on a difference between the second time and the first time.

11. The non-transitory computer-readable media of claim 10, the computer-readable instructions being capable of instructing the computer to perform the method,
  wherein generating the output real-time transport packet to include a value data field having value data stored therein comprises generating the output real-time transport packet to further include an originating time data field having originating time data stored therein, and
  wherein the original time data is based on the first time.

12. A real-time transport packet creating device for use with a source terminal, a destination terminal and a real-time transport packet, the real-time transport packet creating device comprising:
  a plurality of network nodes coupled to participate in a data relay between the source terminal and the destination terminal,
  each of the network nodes generating latency information corresponding to a latency introduced by the network node, and appending the latency information to a received real-time transport packet to generate an output real-time transport packet based on the received real-time transport packet and the latency information, a final one of the output real-time transport packets including a plurality of the latency information respectively corresponding to the plurality of network nodes, such that upon receipt of the final one of the output real-time transport packets, the destination terminal can identify the latency introduced by each of the network nodes,
  wherein each of the output real-time transport packets includes a latency length field including a length value; and wherein each of the plurality of network nodes has incremented the length value, appended a data field, and stored the latency information from the corresponding network node to the appended data field, the length value indicating the number of appended data fields in the respective output real-time transport packet.

13. The real-time transport packet creating device of claim 12, wherein the final one of the real-time transport packets further includes an index to the latency information in the appended data fields.

14. A method of communicating with a source terminal and a destination terminal by way of a real-time transport packet, the method comprising:
  receiving the real-time transport packet;
  generating, by a plurality of network elements coupled to participate in a data relay between the source terminal and the destination terminal, latency information corresponding to latencies introduced by each of the network elements; and
  appending, by each of the network elements, the latency information to the real-time transport packet to generate an output real-time transport packet including a plurality of latency information corresponding to the plurality of network elements, respectively, such that upon receipt of the output real-time transport packet, the destination terminal can identify the latencies introduced by each of the network elements,
  wherein the real-time transport packet includes a latency length field including a length value, further comprising, by each of the network elements, incrementing the length value, appending a data field, and storing the latency information from the corresponding network element in the appended data field, the length value indicating the number of appended data fields in the real-time transport packet.

15. The method of claim 14, wherein the real-time transport packet further includes an index to the latency information in the appended data fields.

\* \* \* \* \*